(12) United States Patent
Webb et al.

(10) Patent No.: US 6,934,664 B1
(45) Date of Patent: Aug. 23, 2005

(54) SYSTEM AND METHOD FOR MONITORING A SECURITY STATE OF AN ELECTRONIC DEVICE

(75) Inventors: Russ Webb, San Jose, CA (US); David Blight, Santa Clara, CA (US)

(73) Assignee: Palm, Inc., Santa Clara, CA (US)

( * ) Notice: Subject to any disclaimer, the term of this patent is extended or adjusted under 35 U.S.C. 154(b) by 39 days.

(21) Appl. No.: 10/151,620

(22) Filed: May 20, 2002

(51) Int. Cl.[7] .............................................. G06F 15/00
(52) U.S. Cl. ...................................................... 702/188
(58) Field of Search ................................ 702/188, 189, 702/108, 116; 705/1, 26, 35, 39, 44; 455/550.1, 455/556.2, 95, 550

(56) References Cited

U.S. PATENT DOCUMENTS

| | | | |
|---|---|---|---|
| 3,637,994 A | 1/1972 | Ellingboe |
| 3,971,916 A | 7/1976 | Moreno |
| 4,001,550 A | 1/1977 | Schatz |
| 4,004,133 A | 1/1977 | Hannan et al. |
| 4,007,355 A | 2/1977 | Moreno |
| 4,007,443 A | 2/1977 | Bromberg et al. |
| 4,017,848 A | 4/1977 | Tannas, Jr. |
| 4,053,735 A | 10/1977 | Foudos |
| 4,063,083 A | 12/1977 | Cathey et al. |
| 4,090,247 A | 5/1978 | Martin |
| 4,092,524 A | 5/1978 | Moreno |
| 4,115,870 A | 9/1978 | Lowell |
| 4,134,537 A | 1/1979 | Glaser |
| 4,277,837 A | 7/1981 | Stuckert |
| 4,305,059 A | 12/1981 | Benton |
| 4,341,951 A | 7/1982 | Benton |
| 4,415,065 A | 11/1983 | Sandstedt |
| 4,442,345 A | 4/1984 | Mollier et al. |
| 4,443,027 A | 4/1984 | McNeely et al. |
| 4,454,414 A | 6/1984 | Benton |
| 4,460,965 A | 7/1984 | Trehn et al. |
| 4,482,802 A | 11/1984 | Aizawa et al. |
| 4,501,960 A | 2/1985 | Jouvet et al. |
| 4,511,970 A | 4/1985 | Okano et al. |
| 4,529,870 A | 7/1985 | Chaum |
| 4,534,012 A | 8/1985 | Yokozawa |

(Continued)

FOREIGN PATENT DOCUMENTS

DE          3906349          9/1990

(Continued)

*Primary Examiner*—Michael Nghiem
(74) *Attorney, Agent, or Firm*—McDonnell Boehnen Hulbert & Berghoff LLP

(57) ABSTRACT

A system and method for monitoring a security state of a portable electronic device (PED), such as a personal digital assistant (PDA), are provided. A security state may be determined by physical or electronic characteristics of the PED. The relative position of PED pieces, the position of a latch, and/or the status of a software application may determine a security state. Furthermore, a PED may have open, closed, and partially open security states. Information about a current security state of a PED may be transmitted to a point-of-sale device (POS), system processor, and/or financial institution. The PED or any of these other devices may use this information to determine whether to allow or restrict a financial transaction involving the PED. Additionally, a software program on the PED may be allowed or restricted from running depending on the information about the current security state.

54 Claims, 9 Drawing Sheets

U.S. PATENT DOCUMENTS

| | | | |
|---|---|---|---|
| 4,536,647 | A | 8/1985 | Atalla et al. |
| 4,542,465 | A | 9/1985 | Stockburger et al. |
| 4,544,833 | A | 10/1985 | Ugon |
| 4,575,621 | A | 3/1986 | Dreifus |
| 4,634,845 | A | 1/1987 | Hale et al. |
| 4,667,087 | A | 5/1987 | Quintana |
| 4,689,478 | A | 8/1987 | Hale et al. |
| 4,697,073 | A | 9/1987 | Hara |
| 4,700,055 | A | 10/1987 | Kashkashian, Jr. |
| 4,720,781 | A | 1/1988 | Crossland et al. |
| 4,736,094 | A | 4/1988 | Yoshida |
| 4,742,215 | A | 5/1988 | Daughters et al. |
| 4,746,788 | A | 5/1988 | Kawana |
| 4,749,982 | A | 6/1988 | Rikuna et al. |
| 4,752,677 | A | 6/1988 | Nakano et al. |
| 4,794,236 | A | 12/1988 | Kawana et al. |
| 4,795,893 | A | 1/1989 | Ugon |
| 4,797,542 | A | 1/1989 | Hara |
| 4,801,787 | A | 1/1989 | Suzuki |
| 4,809,326 | A | 2/1989 | Shigenaga |
| 4,810,862 | A | 3/1989 | Nakano et al. |
| 4,839,506 | A | 6/1989 | Homma et al. |
| 4,855,578 | A | 8/1989 | Hirokawa et al. |
| 4,859,837 | A | 8/1989 | Halpern |
| 4,877,950 | A | 10/1989 | Halpern |
| 4,918,631 | A | 4/1990 | Hara et al. |
| 4,928,001 | A | 5/1990 | Masada |
| 4,941,205 | A | 7/1990 | Horst et al. |
| 5,030,806 | A | 7/1991 | Collin |
| 5,128,997 | A | 7/1992 | Pailles et al. |
| 5,221,838 | A | 6/1993 | Gutman et al. |
| 5,402,095 | A | 3/1995 | Janniere |
| 5,442,645 | A | 8/1995 | Ugon et al. |
| 5,471,045 | A | 11/1995 | Geronimi |
| 5,621,796 | A | 4/1997 | Davis et al. |
| 5,621,797 | A | 4/1997 | Rosen |
| 5,633,930 | A | 5/1997 | Davis et al. |
| 5,671,280 | A | 9/1997 | Rosen |
| 5,682,031 | A | 10/1997 | Geronimi |
| 5,696,827 | A | 12/1997 | Brands |
| 5,721,781 | A | 2/1998 | Deo et al. |
| 5,742,756 | A | 4/1998 | Dillaway et al. |
| 5,744,787 | A | 4/1998 | Teicher |
| 5,770,849 | A | 6/1998 | Novis et al. |
| 5,790,677 | A | 8/1998 | Fox et al. |
| 5,796,831 | A | 8/1998 | Paradinas et al. |
| 5,796,832 | A | 8/1998 | Kawan |
| 5,808,862 | A | 9/1998 | Robbins |
| 5,815,083 | A | 9/1998 | Patarin et al. |
| 5,825,882 | A | 10/1998 | Kowalski et al. |
| 5,834,756 | A | 11/1998 | Gutman et al. |
| 5,850,442 | A | 12/1998 | Muftic |
| 5,867,795 | A | 2/1999 | Novis et al. |
| 5,878,138 | A | 3/1999 | Yacobi |
| 5,878,139 | A | 3/1999 | Rosen |
| 5,889,862 | A | 3/1999 | Ohta et al. |
| 5,905,976 | A | 5/1999 | Mjolsnes et al. |
| 5,910,989 | A | 6/1999 | Naccache |
| 5,915,226 | A | 6/1999 | Martineau |
| 5,943,423 | A | 8/1999 | Muftic |
| 5,943,624 | A | 8/1999 | Fox et al. |
| 5,963,924 | A | 10/1999 | Williams et al. |
| 5,992,738 | A | 11/1999 | Matsumoto et al. |
| 6,016,476 | A * | 1/2000 | Maes et al. ............... 705/1 |
| 6,016,484 | A | 1/2000 | Williams et al. |
| 6,018,724 | A | 1/2000 | Arent |
| 6,038,551 | A | 3/2000 | Barlow et al. |
| 6,058,483 | A | 5/2000 | Vannel |
| 6,088,797 | A | 7/2000 | Rosen |
| 6,092,147 | A | 7/2000 | Levy et al. |
| 6,105,862 | A | 8/2000 | Pailles et al. |
| 6,116,506 | A | 9/2000 | Matsumoto et al. |
| 6,122,625 | A | 9/2000 | Rosen |
| 6,138,148 | A | 10/2000 | Lipkin |
| 6,145,740 | A | 11/2000 | Molano et al. |
| 6,175,921 | B1 | 1/2001 | Rosen |
| 6,178,409 | B1 | 1/2001 | Weber et al. |
| 6,182,894 | B1 | 2/2001 | Hackett et al. |
| 6,203,330 | B1 | 3/2001 | Buchholtz |
| 6,253,999 | B1 | 7/2001 | Yamamoto et al. |
| 6,257,486 | B1 | 7/2001 | Teicher et al. |
| 6,567,672 | B1 * | 5/2003 | Park et al. ............... 455/574 |
| 2002/0087894 | A1 * | 7/2002 | Foley et al. ............. 713/202 |
| 2004/0058705 | A1 * | 3/2004 | Morgan et al. ......... 455/556.1 |

FOREIGN PATENT DOCUMENTS

| | | |
|---|---|---|
| GB | 1583090 | 1/1981 |
| GB | 2201125 A | 8/1988 |
| JP | 54-46434 | 4/1979 |
| JP | 57-182259 | 11/1982 |
| JP | 57-182260 | 11/1982 |
| JP | 59-128664 | 7/1984 |
| JP | 61-237166 | 10/1986 |
| JP | 62-66374 | 3/1987 |
| JP | 62-95660 | 5/1987 |
| JP | 63-240686 | 10/1988 |
| JP | 64-7285 | 1/1989 |
| JP | 64-64088 | 3/1989 |
| JP | 01-224888 | 9/1989 |
| JP | 59-221691 | 12/1994 |

* cited by examiner

PERSONAL DIGITAL ASSISTANT

Open Security State

Closed Security State

Partially Open Security State

Open Security State

Closed Security State

Partially Open Security State

SYSTEM AND METHOD FOR MONITORING A SECURITY STATE OF AN ELECTRONIC DEVICE

FIELD OF THE INVENTION

The present invention pertains to a system and method for monitoring a security state of a portable electronic device, such as a personal digital assistant.

BACKGROUND OF THE INVENTION

Millions of financial transactions occur every day across the globe. A large portion of these financial transactions, occurring in the form of a cash or credit card purchase, involve an exchange of products or services for money. For example, a financial transaction might include purchasing one or more products such as the latest designer wear, or the newest compact disk recording, or simply buying a hotdog at the local food stand. Other times a financial transaction might include purchasing a service such as dry cleaning, taxi transportation, or a car wash. Of course, these examples provide just a few types of products or services available, but one can imagine the number of financial transactions involving products or services that occur every day. Furthermore, there are other types of financial transactions, such as a withdrawal or transfer of money, purchasing or trading of stocks and funds, and so on. Because so many financial transactions occur each day, it is no surprise that attempts have been made to optimize and simplify the financial transaction process. Unfortunately, current methods and systems for use in a financial transaction still leave the process an undesirable one. Before proceeding, it should be understood hereinafter that the term "transaction" is interchangeable with the term "financial transaction" unless otherwise specified.

Presently, most transactions include payment by cash money or credit. Although credit cards may provide advantages over cash, they do not provide an optimum solution. Most people carry a sizeable number of cards such as credit cards, bank or cash cards, identification cards, grocery store cards, gas cards, and so on. Carrying multiple cards is often bulky and cumbersome, which is both inconvenient and undesirable to the person carrying them. Important information such as a credit card number, expiration date, and the authorized user's name and signature are all located on the surface of the card. This leaves the authorized user and their credit vulnerable to thieves or others who might use that information wrongly. For example, by simply using this important information and forging the user's signature, one can access and use someone else's credit. Additionally, a criminal may use another card to mimic a user's credit card and steal a user's identity. Thus, credit cards may be problematic when attempting to identify and authenticate a user.

Attempting to address the problems of having multiple credit cards, smart cards and super smart cards (i.e., smart cards with small displays and keypads) were developed. Smart cards and super smart cards are credit card-sized plastic cards (according to the popular ISO standards, they are held to the dimensions of 3.370"×2.125"×0.03") that contain varying amounts of information in an embedded microchip. Smart cards and super smart cards differ from magnetic stripe credit cards because the amount of information that can be stored is typically greater, and some cards can be reprogrammed to add, delete or rearrange data.

However, current smart cards and super smart cards still retain many of the drawbacks of traditional credit cards. For instance, smart card transactions may require a user's signature and may be still recorded on paper. Similar to credit cards, smart cards may not allow remote exchange of information, and although contactless cards have been developed, each contactless card may still require the user to position the card near the card reader. For example, some cards cannot go beyond 0.25 inches from the card reader. In addition, due to their standard credit-card size, smart cards and super smart cards also lack feature-rich functionality and are therefore limited to few functions. Such limited functionality presents an undesirable solution, as smart cards and super smart cards cannot conveniently replace other electronic devices to provide additional functionality, such as Internet access, email access, organizational programs (e.g., address book, appointment calendars, etc.), database programs, video games, and the like.

Portable electronic user devices, such as personal digital assistants, may also be used for financial transactions. However, such devices, as well as credit cards, smart cards, and super smart cards, may face difficulties when attempting to identify a user device (e.g., portable electronic device or card). For example, due to copying of software programs, current user devices may be unable to identify an original copy of a software program and the user device for which the program was intended. Furthermore, a criminal may steal a user device, or copy a software program and identification information from a user device, in order to access the user's financial assets. Standard authentication mechanisms, such as using a user's signature or serial number identification, may not provide enough security from the most daring and capable criminals.

Accordingly, it is desirable to have an electronic financial transaction system that overcomes the above deficiencies associated with the prior art. This may be achieved by monitoring a security state of a portable electronic device.

SUMMARY

A system, device, and method for monitoring a security state of a portable electronic device (PED), such as a personal digital assistant (PDA), are provided. In an aspect of an exemplary embodiment, a method includes determining a security state of a PED and utilizing information about the security state to determine whether to allow a software program on the PED to run. The software program may enable the portable electronic device to engage in a financial transaction. Further, determining the security state may include detecting the position of a latch or the relative position of a first piece and second piece of the PED. A security state may also be determined by the status of an application (e.g., electronic wallet application) on the PED. Furthermore, an open security state, closed security state, or partially open security state may be present, and information about the current security state may be transmitted to a point-of-sale device (POS). Additionally, a transition involving the current security state may be monitored to determine whether to allow the software program to run.

In another aspect of the present embodiment, a monitoring system may include a PED having a plurality of security states, and a POS with which it communicates. The plurality of security states may include a current security state, and information about the current security state may be used to determine whether to allow a financial transaction between the PED and the POS. Additionally, the plurality of security states may include an open security state, a closed security state, and a partially open security state. The open security state may correspond to an open application on the PED, and the closed security state may correspond to a closed application on the PED. Additionally, or alternatively, the plurality of security states may be determined by the position of a latch or the relative position of a first piece and a second piece of the PED. A financial transaction may be allowed if the current security state is an open security state, and restricted if the current security state is a closed security state. Additionally, a transition between the current security state and at least one of the plurality of security states may determine whether to allow a financial transaction between the PED and the POS.

In yet another aspect of the present embodiment, a PED may include a first piece, a second piece connected to the first piece by a hinge, and a sensor connected to the hinge. The sensor may detect the relative position of the first piece and the second piece and thus determine a plurality of security states, which may include a current security state. The PED may engage in a financial transaction with a POS depending on the current security state. The plurality of security states may also include an open security state, a closed security state, and a partially open security state. The open security state may correspond to the first piece and second piece oriented substantially parallel to one another, and the closed security state may correspond to the second piece covering the first piece.

The monitoring system presented in the exemplary embodiments may have numerous advantages. First, a monitoring system using physical or electrical characteristics of a PED as a mechanism for defining a security state provides a level of security against criminals or others who may mimic the device in order to access a user's financial account (e.g., by copying software programs from the device). For example, the present system may make it more difficult for a criminal to access a user's financial account while the PED is in a closed security state. Additionally, by using existing hardware and software (e.g., hardware pieces or software applications on the PED) for determining a security state, few additional resources may be needed for creating the monitoring system, and it may be implemented at minimal additional cost. Also, such a system may intuitively bring the security state of the PED under the direct manipulation and supervision of the user. Furthermore, the present monitoring system may also be conveniently combined with a number of identification mechanisms (e.g., personal identification numbers (PINs), serial numbers, fingerprint analysis, passwords, etc.) for a better and more effective monitoring system.

DETAILED DESCRIPTION

Figure 1:
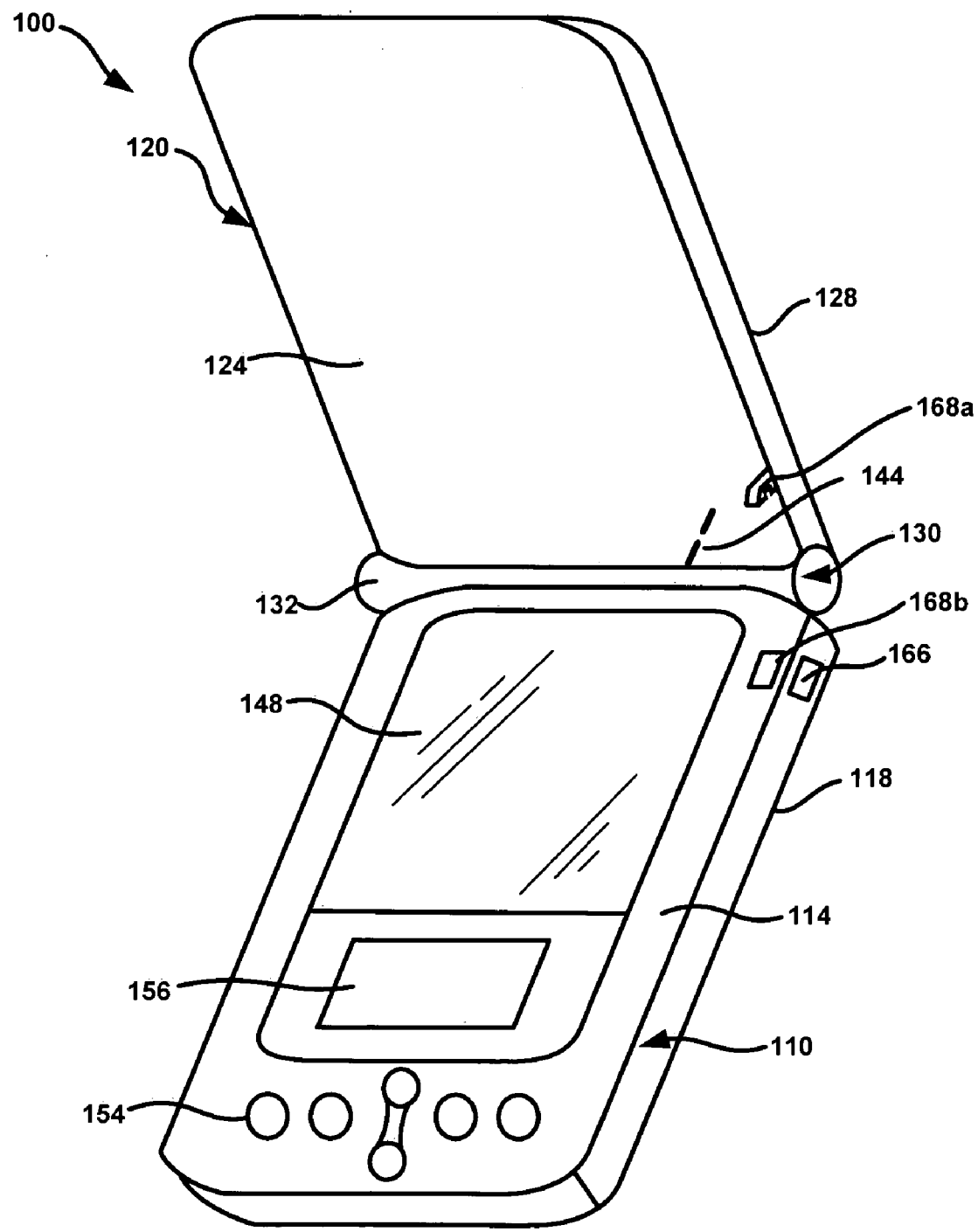
FIG. 1 illustrates an exemplary personal digital assistant (PDA)

I. Monitoring Security States of a Personal Digital Assistant

In an exemplary embodiment, a user utilizes a portable electronic device, such as a personal digital assistant (PDA), to engage in a financial transaction with a transactional terminal, such as a point-of-sale device (POS). Before such a transaction can take place, it may be beneficial to verify that a valid PDA is being utilized. This may be accomplished by monitoring a security state of a PDA, which may be based on certain physical characteristics of the device. In an exemplary scenario, the relative position of a first piece (e.g., base) and a second piece (e.g., lid) of the PDA may be detected by a sensor and used to determine a security state. For example, if the second piece is covering the first piece, the PDA will generally not be in use, and a financial transaction between the PDA and a transactional terminal may be restricted. This type of security state may be called a "closed security state". Similarly, a number of other security states, such as an "open security state" and a "partially open security state", may be determined by the relative position of the first piece and second piece. Additionally, a PDA's security state may be determined by other physical characteristics, such as the position of a latch on the device.

Electronic characteristics of the PDA, such as the status of a software application, may also be utilized for determining a security state. For example, an open security state may exist when a particular software application on the device is open, and a closed security state may be present when the software application is closed.

Once a security state is determined, the PDA may regulate financial transactions depending on the current security state. For example, if a closed security state is present, financial transactions between the PDA and transactional terminals (e.g., POS) may be restricted. If an open security state exists, transactions may be allowed. If a partially open security state is present, financial transactions may be allowed, but with certain additional limitations (e.g., lower possible transaction amounts, fewer possible vendors, etc.). It should be understood that other components may also regulate financial transactions that involve the PDA, such as the POS, a system processor in communication with the POS, or a financial institution in communication with the PDA.

The monitoring system presented in the exemplary embodiments may have numerous advantages. First, a monitoring system using physical or electrical characteristics of a PDA as a mechanism for defining a security state provides a level of security against criminals or others who may mimic the device in order to access a user's financial account (e.g., by copying software programs from the device). For example, the present system may make it more difficult for a criminal to access a user's financial account while the PDA is in a closed security state. Additionally, by using existing hardware and software (e.g., hardware pieces or software applications on the PDA) for determining a security state, few additional resources may be needed for creating the monitoring system, and it may be implemented at minimal additional cost. Also, such as system has the advantage of intuitively bringing the security state of the PDA under the direct manipulation and supervision of the user. Furthermore, the present monitoring system may also be conveniently combined with a number of identification mechanisms (e.g., PINs, serial numbers, fingerprint analysis, passwords, etc.) for a better and more effective monitoring system.

II. Exemplary PDA

The exemplary embodiments described herein provide a system and method for monitoring the security state of a PDA. It should be understood that by utilizing the teachings described herein, the system and method can be applied to any type of portable electronic device (e.g., mobile telephone, pager, hand-held device, etc.), and that details regarding the PDA are provided as an example, and are not necessary to the invention unless otherwise specified.

A. Exemplary PDA Exterior configuration

FIG. 1 illustrates a personal digital assistant (PDA) 100 for use in a financial transaction. The PDA 100 may be used for processes such as money transfer, withdrawal of money, trading, or payment for a product or service. Accordingly, the PDA 100 can be used to provide payment information and receive a digital receipt to record an approved transaction. The illustrated PDA 100 includes a first piece 110 having a first side 114 and a second side 118. The first piece 110 may be a base, where functional circuitry and electronics for the PDA 100 may be stored. Additionally, the PDA 100 includes a second piece 120 with a first side 124 and second side 128. The second piece 120 may be a lid that is used to protect the first piece 110 (i.e., base).

In this exemplary embodiment, the first piece 110 and the second piece 120 may be connected together by a hinge 130. The hinge 130 may enable the second piece 120 to rotate and be oriented in a number of different positions relative to the first piece 110. Preferably, a sensor 132 may be connected to the hinge 130 to detect the relative position of the first piece 110 and the second piece 120. The relative position of the two pieces 110, 120 may be used to define a security state of the PDA 100.

In an exemplary scenario, the second piece 120 may be arranged substantially parallel to the first piece 110 (i.e., the lid and base both lay flat and do not cover one another in a one hundred eighty (180) degree angular position). This position may be defined as an "open security state". Additionally, the second piece 120 may be used to cover the first side 114 of the first piece 110 (i.e., the lid is folded over the first side 114 of the base in a zero (0) degree angular position). This position may be defined as a "closed security state". Furthermore, the PDA 100 may be arranged so that the second side 118 of the first piece 110 covers the second piece 120 (i.e., the lid is folded back behind the base in a three hundred sixty (360) degree angular position). This position may be defined as a "partially open security state." More detail will be provided shortly concerning the determination of security states using the relative position of the first and second pieces 110, 120.

It should be understood that alternate PDAs may define security states using more or fewer pieces that may be connected and oriented in any number of different ways. Furthermore, as will be described later, other mechanisms may also be utilized for defining a security state of a PDA, such as the position of a latch or the status of an electronic application on the PDA.

The first piece 110 may also include a number of functional components, such as a touch-screen display 148, optional navigating keys 154, a handwriting recognition area 156, and a latch 166. A transceiver 144 may also be connected to the first piece 110, though in alternate embodiments, the transceiver 144 can be separate from the PDA 100.

B. Exemplary PDA Interface

In the present embodiment, the transceiver 144 includes an infrared (1R) interface (not shown). Although the interface is external to (i.e., on the outside of) the PDA 100 in this exemplary embodiment, it can also be internal to the PDA 100, depending on the desired application. Preferably, the transceiver 144 can operate in an appropriate electromagnetic frequency range to communicate with another device (e.g., point-of-sale device) over a communication channel, as described more below. Although the IR interface is utilized in this exemplary embodiment, other types of electromagnetic wave technologies may also be utilized, such as an internal or external antenna, or an optical interface. For example, the IR interface can be used by itself or together with an antenna to communicate with another device, or the antenna itself can be used. An exemplary personal digital assistant with an antenna is described in commonly owned U.S. Pat. No. 6,064,342, the contents of which are incorporated in its entirety herein by reference. It should be understood that alternate communication interfaces, such as an optical interface, may also be used to transmit information to and receive information from another device (e.g., point-of-sale device). It should be further understood that radio frequency (RF) communication technology, such as Bluetooth™, may be utilized with the present embodiment. For more information on Bluetooth™, one can refer to the Bisdikian (2001), *IEEE Communications Magazine*, "An Overview of the Bluetooth Wireless Technology", the contents of which are incorporated in its entirety herein by reference.

C. Exemplary PDA Input Mechanisms

The touch-screen display 148 may operate as a dynamic data entry mechanism that reduces the need for another input mechanism, such as a keyboard, handwriting tablet, or mouse. However, by utilizing another input mechanism, a regular display that does not apply touch-screen technology may instead be used. The touch-screen display 148 has specific areas on the screen that may be defined as "graphical input regions" (GIRs). The user may use their finger, or an instrument such as a stylus, to touch the screen and select a GIR. Depending on the phase of an operation, different GIRs may be present on the screen to reflect valid options for the user to choose. Similarly, the GIRs on each screen may be customized and placed on the screen in a unique fashion for the user. The touch-screen display 148 may include a full color VGA (video graphics array) or SVGA (super video graphics array) monitor for highly graphic client applications, a monochrome monitor, monochrome or color liquid crystal display (LCD), or a light emitting diode display (LED) or organic LED (OLED), depending on the desired application.

The optional navigating keys 154 can be utilized to navigate information stored within the PDA 100 or information displayed on the touch-screen display 148. The handwriting recognition area 156 may be utilized to input letters, numbers, or words into the PDA 100, via a stylus or pen. The navigating keys 154 and handwriting recognition area 156 provide additional functionality to the PDA 100 and allow data to be entered into or navigated within the PDA 100. An exemplary handwriting recognition area 156 is described in commonly owned U.S. Pat. No. 5,889,888, granted to Marianetti, II, et al., the contents of which are incorporated in its entirety herein by reference.

D. Exemplary Latch and Locking Mechanism

The position of the latch 166 (e.g., vertical, horizontal, or at an angle) may be used for defining a security state of the PDA 100, as will be described in an exemplary method of the present embodiment. It should be understood that a security state may be determined by a combination of factors, such as the relative position of the pieces 110, 120 along with the position of the latch 166. Additionally, rotating the latch 166 may cause a lock 168a, 168b to engage when the PDA 100 is entering or is in a closed security state. Preferably, the lock 168a, 168b may cause the second piece 120 (i.e., lid) to become physically connected to the first side 114 of the first piece 110 (i.e., base). Alternatively, the lock 168a, 168b may be engaged and used to fasten the first piece 110 and second piece 120 in any relative position.

III. Exemplary PDA and Point-of-sale Device (POS)

Figure 2:
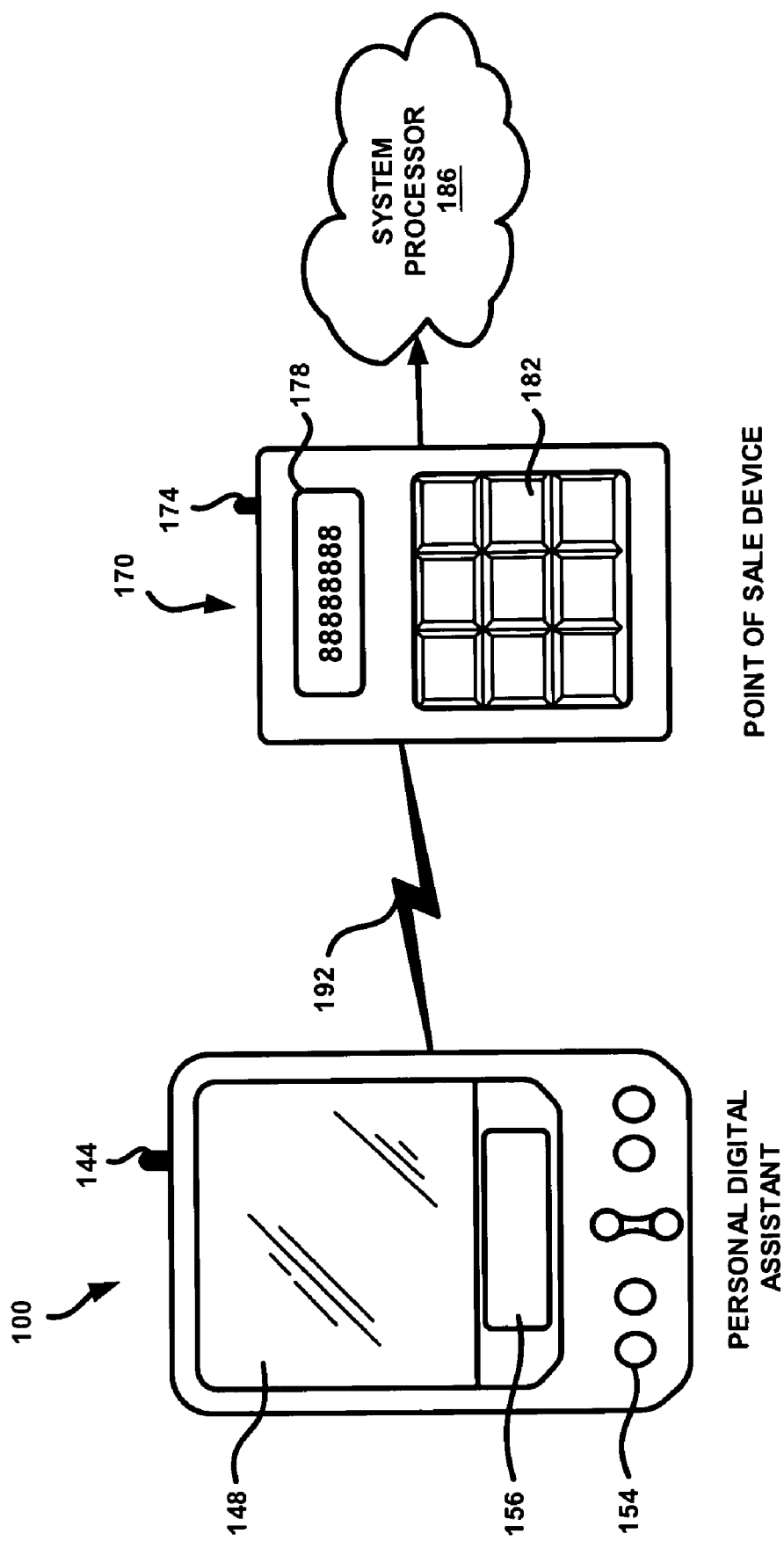
FIG. 2 illustrates the PDA of FIG. 1 and a point-of-sale device (POS) for use in a financial transaction.

FIG. 2 illustrates the PDA 100 in communication with an exemplary point-of-sale device (POS) 170. The POS 170 may generally include a transceiver 174, digital display 178, and keypad 182. It should be understood that the transceiver 174 may be integral or separate from the POS 170. As known in the art, the POS 170 can communicate with a system processor 186 for checking transaction information and authorizing the transaction, though in alternate embodiments, the POS 170 may perform these functions itself. Furthermore, the POS 170 may contain a memory (not shown) for storing data sent from the PDA 100. The data stored within the memory may include serial numbers for identifying the PDA 100, as well as other identification information, as will be described below. The POS 170 may also be connected to one or more networks (not shown), where data sent from the PDA 100 may be stored and evaluated. It should be understood that in alternate embodiments, the POS 170 may have more or fewer features, depending on the desired functionality of the device.

Payment information (e.g., account information) and transaction information (e.g., a digital receipt that records the transaction) may be communicated between the PDA 100 and the POS 170 over the communication channel 192. Preferably, the communication channel 192 includes a wireless connection such that the PDA 100 and the POS 170 can communicate remotely from each other. The wireless connection and the exemplary protocols utilized over the communication channel 112 are described more below.

Figure 3:
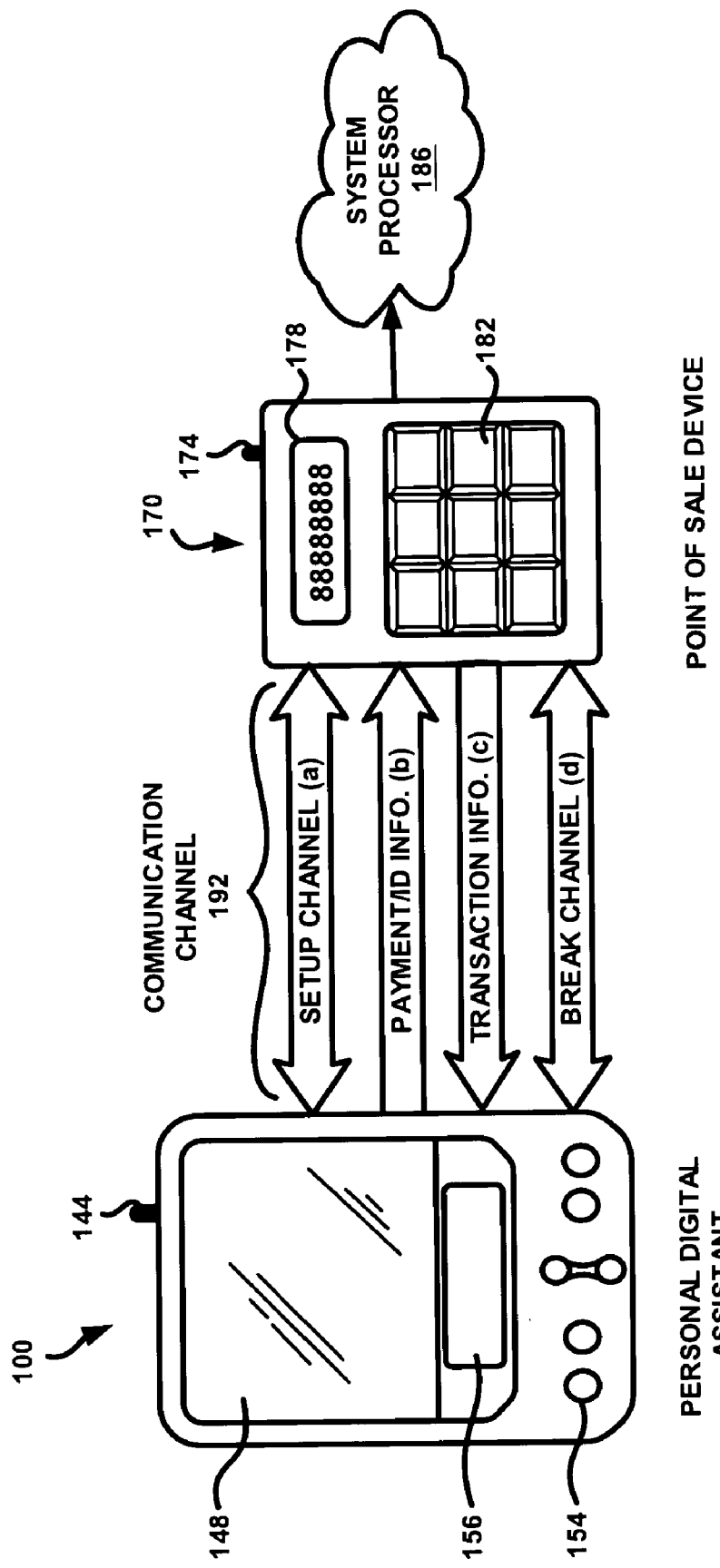
FIG. 3 illustrates general processing and recording of a financial transaction utilizing the PDA and POS of FIG. 2.

FIG. 3 illustrates exemplary general processing and recording of a financial transaction using the PDA 100 and POS 170 of FIG. 2. According to this example, a customer may present the PDA 100 for payment of a product or service to a cashier via the POS 170. Upon presentation, the PDA 100 may negotiate and set up a secure wireless communication channel 192 with a POS 170 (see 192a). Although the POS 170 is specific to this transaction, it does not necessarily have to be visible to the user of the PDA 100. For instance, the POS 170 could be at another location remote from the PDA 100. This degree of remoteness may depend on the type of communication channel 192 utilized in the transaction, as described below.

When the communication channel 192 is setup, payment information stored on the PDA 100 may be transmitted to the POS 170 (see 192b). Payment information might include any type of account information needed to perform and complete a transaction including, but not limited to, a credit card account number, expiration date, authorized user name, billing address, and so on. Additionally, or alternatively, the PDA 100 may send identification information, including information about the current security state, PIN, and serial number, to the POS 170 to help identify the PDA 100. Alternatively, the PDA 100 may utilize the information about the current security state to identify whether a valid PDA 100 is being used for the financial transaction. Exemplary methods of determining and utilizing security states will be discussed later. When the POS 170 connects to the PDA 100 and receives the payment and/or identification information, it may forward the necessary information to the system processor 186, which may be located at a financial institution. Alternatively, the POS 170 may forward the information directly to a financial institution.

The system processor 186 might check the payment and/or identification information with an issuing financial institution for validity and amount limits. It should be understood that alternatively, the validity of the payment and identification information may be determined within the POS 170, or within a network connected to the POS 170. In the present embodiment, the system processor 186 may then pass a message that accepts or declines the transaction to the POS 170.

Upon acceptance, transaction information (e.g., a digital receipt) may be forwarded to the PDA 100 to record the transaction, and the sale is complete (see 192c). Preferably, the communication channel 192 is broken, possibly signaled by the receiving of the digital receipt, to end any further communication relating to this transaction (see 192d). Of course, it should be understood that this example provides one basic type of transaction, and that many other types of transactions known in the art might occur differently.

IV. Exemplary PDA in Communication with Financial Institutions

Figure 4:
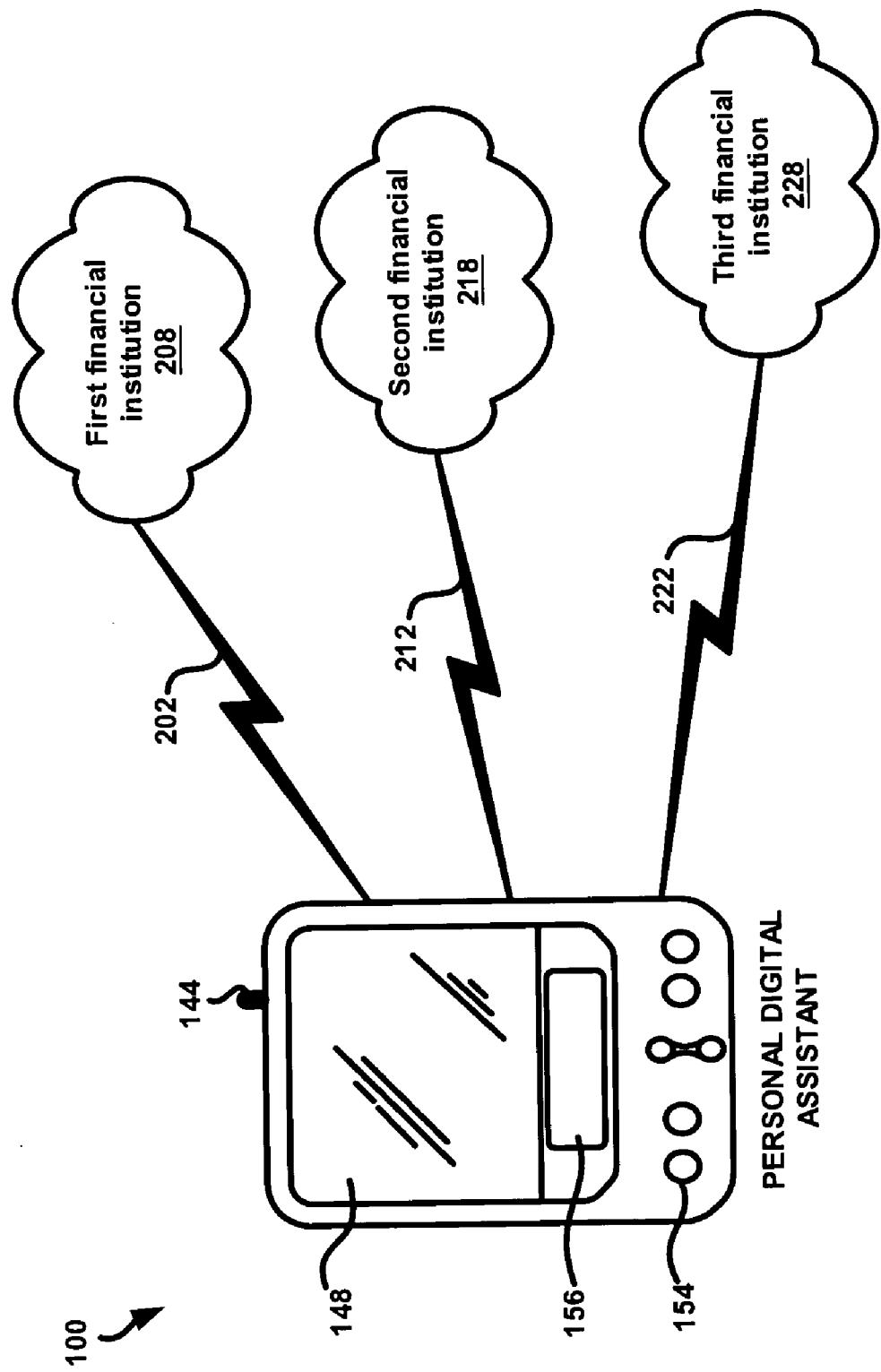
FIG. 4 illustrates the PDA of FIG. 1 in communication with financial institutions.

Turning now to FIG. 4, communication between the PDA 100 and financial institutions 208, 218, 228 is shown. As will be described later in an exemplary method, the PDA 100 may transmit security state information (e.g., information about its current security state) to one or more of the financial institutions 208, 218, 228 through communication channels 202, 212, 222. Additionally, identification information for the PDA 100 may also be transmitted to these institutions 208, 218, 228. This information may be transferred to the institutions 208, 218, 228 either directly or via the POS 170 and/or the system processor 186. Furthermore, the security state information and identification information may be sent to the financial institutions 208, 218, 228 immediately after a security state is determined (e.g., independent of whether a financial transaction is taking place), at the beginning of a financial transaction, or following a delay (e.g., ten seconds) after a security state is determined or a financial transaction is initiated.

Additionally, although the security state information is sent to one of the financial institutions 208, 218, 228 in the present embodiment, it alternatively may be multicast to any number of the financial institutions 208, 218, 228. A proxy (not shown), such as a third-party service or a user's own personal computer, may be utilized for multicasting capabilities. It should also be understood that alternate embodiments may include more or fewer financial institutions. Additionally, it should be understood that the preceding description of communication with the financial institutions 208, 218, 228 may also apply to the system processor 186, or the POS 170 and its associated network(s).

In the present embodiment, one or more of the financial institutions 208, 218, 228 may regulate financial transactions between the PDA 100 and the POS 170 depending on the security state of the PDA 100. In an exemplary scenario, the PDA 100 seeks to engage in a financial transaction with the POS 170 by utilizing a financial account issued from the financial institution 208. If the PDA 100 is in an open security state, the financial institution 208 may allow the transaction between the PDA 100 and the POS 170. If the PDA 100 is in a closed security state, the financial institution 208 may not authorize a transaction involving the PDA 100, and thus, transactions between the PDA 100 and the POS 170 may be restricted.

If the PDA 100 is in a partially open security state, the financial institution 208 may regulate certain transaction parameters, such as the amount of a transaction or times when a transaction is permitted. Thus, a limited financial transaction between the PDA 100 and the POS 170 may be allowed. For example, when the PDA is in a partially open security state, the financial institution 208 may allow the PDA 100 to engage in transactions with certain vendors only during certain hours of the day, or may only allow transactions below a certain monetary value. Of course, these examples provide just a sampling of the possible limitations that any of the financial institutions 208, 218, 228 may place on financial transactions involving the PDA 100.

V. Exemplary Physical Security States Using a Hinge Mechanism

Figure 5A:
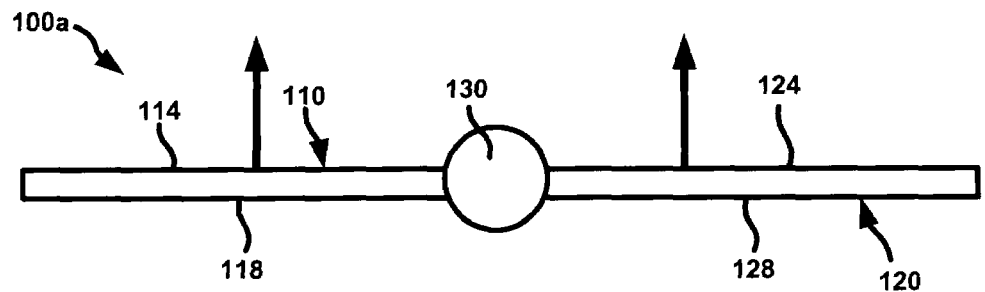
FIGS. 5a–5c illustrate block diagrams of security states of the PDA of FIG. 1 using a hinge mechanism.
Figure 5B:
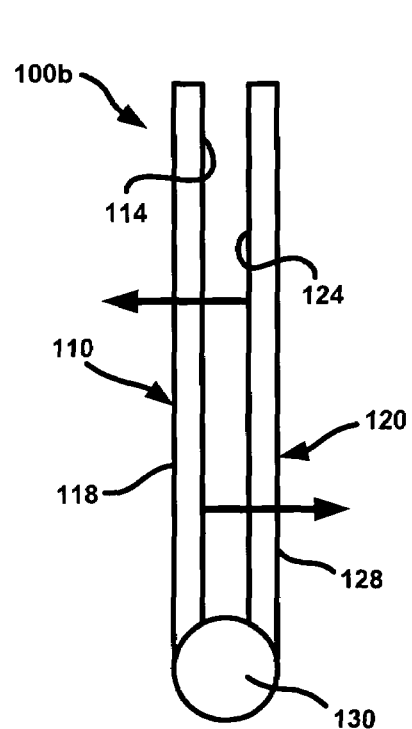
Figure 5C:
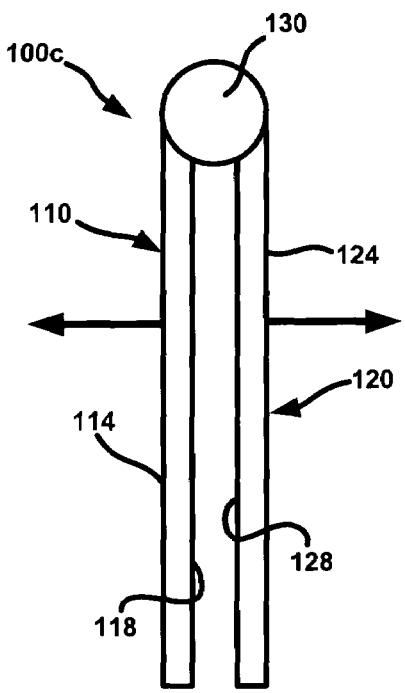

Turning now to FIGS. 5a–5c, exemplary security states for the PDA are shown. In FIGS. 5a–5c, the PDAs are referenced by 100a, 100b, and 100c, respectively, to illustrate the different relative positions of the first and second pieces 110, 120. Other than these different positions, each of the PDAs 100a, 100b, 100c are identical to each other and the PDA 100. Additionally, the first side 114 of the first piece 110 and the first side 124 of the second piece 120 are more clearly indicated by arrows pointing away from these surfaces.

In FIG. 5a, an open security state is shown, where the first piece 110 and the second piece 120 of the PDA 100a are substantially parallel to one another. This configuration may indicate that the PDA 100a is "in use", and the PDA 100a may engage in financial transactions with the POS 170 without additional limitations while in the open security state.

In FIG. 5b, a closed security state is shown, where the first side 114 of the first piece 110 and the first side 124 of the second piece 120 are facing one another. Since the functional components of the PDA 100b (e.g. touch screen display 148, handwriting recognition area 156, etc.) are covered by the second piece 120 and are not accessible to the user, the PDA 100b may not be in use when it is in a closed security state. Additionally, if another electronic device attempts to mimic the PDA 100b in order to engage in a financial transaction with the POS 170 while the PDA 100b is in the closed security state, the POS 170 or any other device within the monitoring system may recognize this is as an illegal transaction and thus reject the connection. Therefore, closed security states provide a way of preventing unauthorized electronic devices from engaging in financial transactions on behalf of the PDA 10b.

In FIG. 5c, an exemplary partially open security state is shown for the PDA 100c. In the present embodiment, the second piece 120 has been folded back behind the first piece 110. Although the functional components of the PDA (e.g. touch screen display 148, handwriting recognition area 156, etc.) are accessible to the user in a partially open security state, the sensor 132 may detect that the PDA 100c is not in the standard operating position (i.e., open security state). Thus, the PDA 100c and/or POS 170 may limit the types of transactions that the PDA 100 may engage in. For example, the PDA 100c may only be able to engage in financial transactions with certain POS terminals or conduct transactions under a certain dollar amount. Alternatively, the partially open security state may be treated as an open or closed security state, and therefore, financial transactions with the POS 170 may be either filly allowed or restricted.

It should be understood that any number of security states may be utilized with the present embodiment. For example, depending on the degree by which the first piece 110 and the second piece 120 are separated, a number of alternate security states may also be defined. In an exemplary embodiment, if the first piece 110 and the second piece 120 are separated by less than 10 degrees, such as in FIG. 5b, the PDA 100 may consider the configuration to be a closed security state. If the first piece 110 and the second 120 are separated between 10 and 90 degrees, a different security state may be defined having fewer limitations than a closed security state, but more limitations than a partially open security state.

If the first piece 110 and the second 120 are approximately 360 degrees apart, such as in FIG. 5c, a partially open security state may be present, and financial transactions may occur with additional limitations (e.g. lower credit limit, fewer vendors etc.). If the first piece 110 and the second piece 120 have a separation between 160 and 200 degrees, an open security state may be present, and financial transactions may be conducted without any additional limitations. It should be understood that the preceding discussion of degree separations, PDA configurations, and security states is meant to illustrate, not limit, the spirit and scope of the present embodiment.

VI. Exemplary Physical Security States Using a Latch Mechanism

Figure 6A:
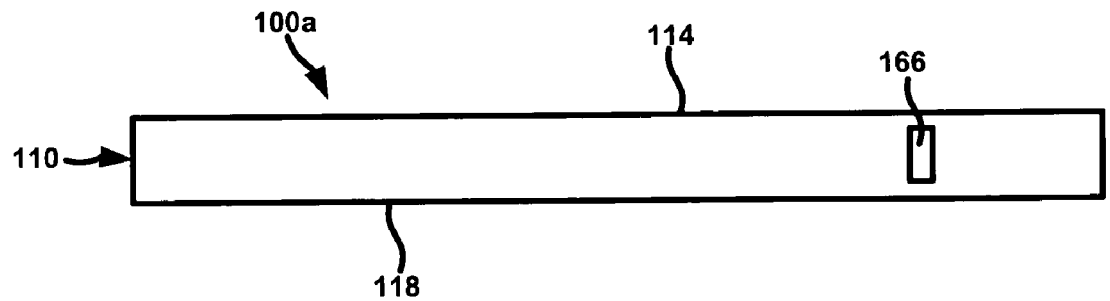
FIGS. 6a–6c illustrate block diagrams of security states of the PDA of FIG. 1 using a latch mechanism.
Figure 6B:
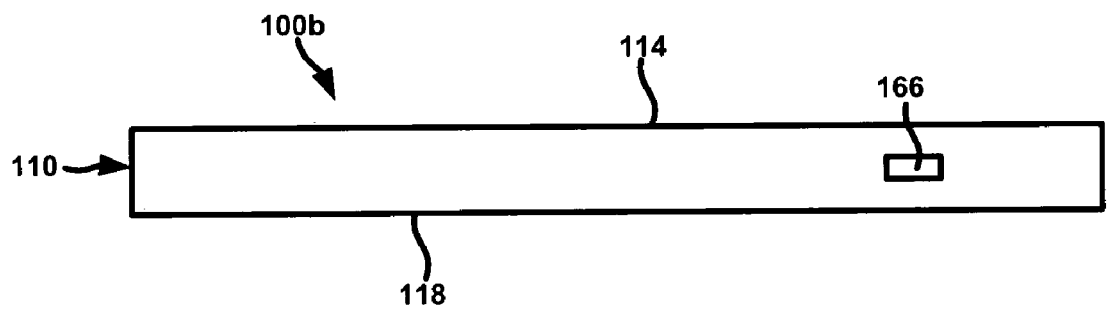
Figure 6C:
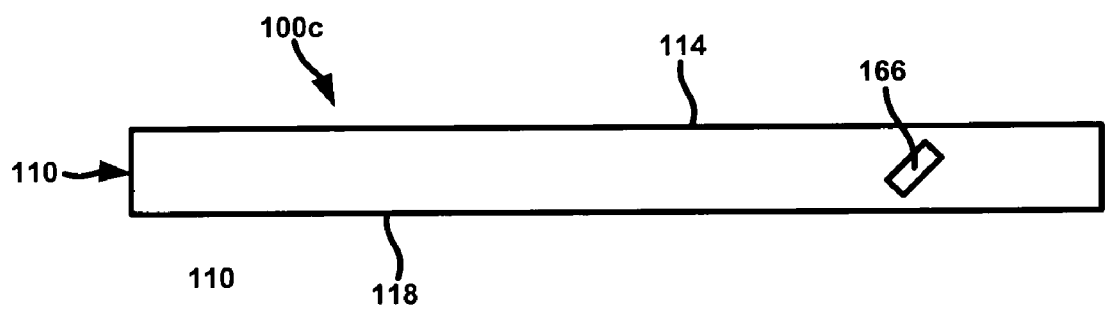

FIGS. 6a–6c illustrate an exemplary set of security states for the PDA determined by the position of a latch 166. As with FIGS. 5a–5c, a reference to PDAs 100a, 10b, and 100c is used in FIGS. 6a–6c to denote the different exemplary latch positions. In FIG. 6a, the latch 166 is vertical and perpendicular to the first side 114 and second side 118 of the first piece 110. In the present embodiment, this configuration is an open security state, and financial transaction with the POS 170 may occur without limitation while the PDA 100a is in this state.

In FIG. 6b, an exemplary closed security state is shown, where the latch 166 is substantially parallel to the first side 114 and the second side 118 of the first piece 110. As with the embodiment shown in FIG. 5b, financial transactions with the POS 170 may be restricted while in this state. Additionally, the latch 166 may cause a lock on the PDA 100b to physically engage when the second piece 120 (i.e., lid) is covering and in contact with the first side 114 of the first piece 110 (i.e., base).

In FIG. 6c, an exemplary partially open security state is shown, where the latch 166 is at approximately 45 degrees to the first side 114 and the second side 118 on the first piece 110. As with the embodiment shown in FIG. 5c, the PDA 100c may allow financial transactions to occur with the POS 170 with an additional limitation (e.g., lower credit limit, limited vendors, etc.).

Additionally, the present embodiment utilizing the latch 166 for determining a security state may be combined with the previously described embodiment that used the relative position of the first piece 110 and second piece 120 for defining a security state. To illustrate, in an exemplary scenario, a PDA 100 may be in a closed security state only if the pieces 110, 120 and the latch 166 are both in closed security state configurations (e.g., as shown in FIGS. 5c and 6c). Thus, it should be understood that any combination of the disclosed embodiments within the present application may be utilized for defining a security state.

It should be further understood that the above discussion of angles, configurations of the PDA 100, and security states is merely exemplary and that in an alternate embodiment, the configurations of the first piece 110, second piece 120 and latch 166 may correspond to different security states. For example, in an alternate embodiment, the configuration shown in FIGS. 5a, 6a may correspond to a partially open security state or a closed security state, the configuration shown in FIGS. 5b, 6b may correspond to a partially open security state or an open security state, and/or the configuration shown in FIGS. 5c, 6c may correspond to an open security state or a closed security state.

VII. Exemplary Electronic Security States on the PDA

Figure 7:
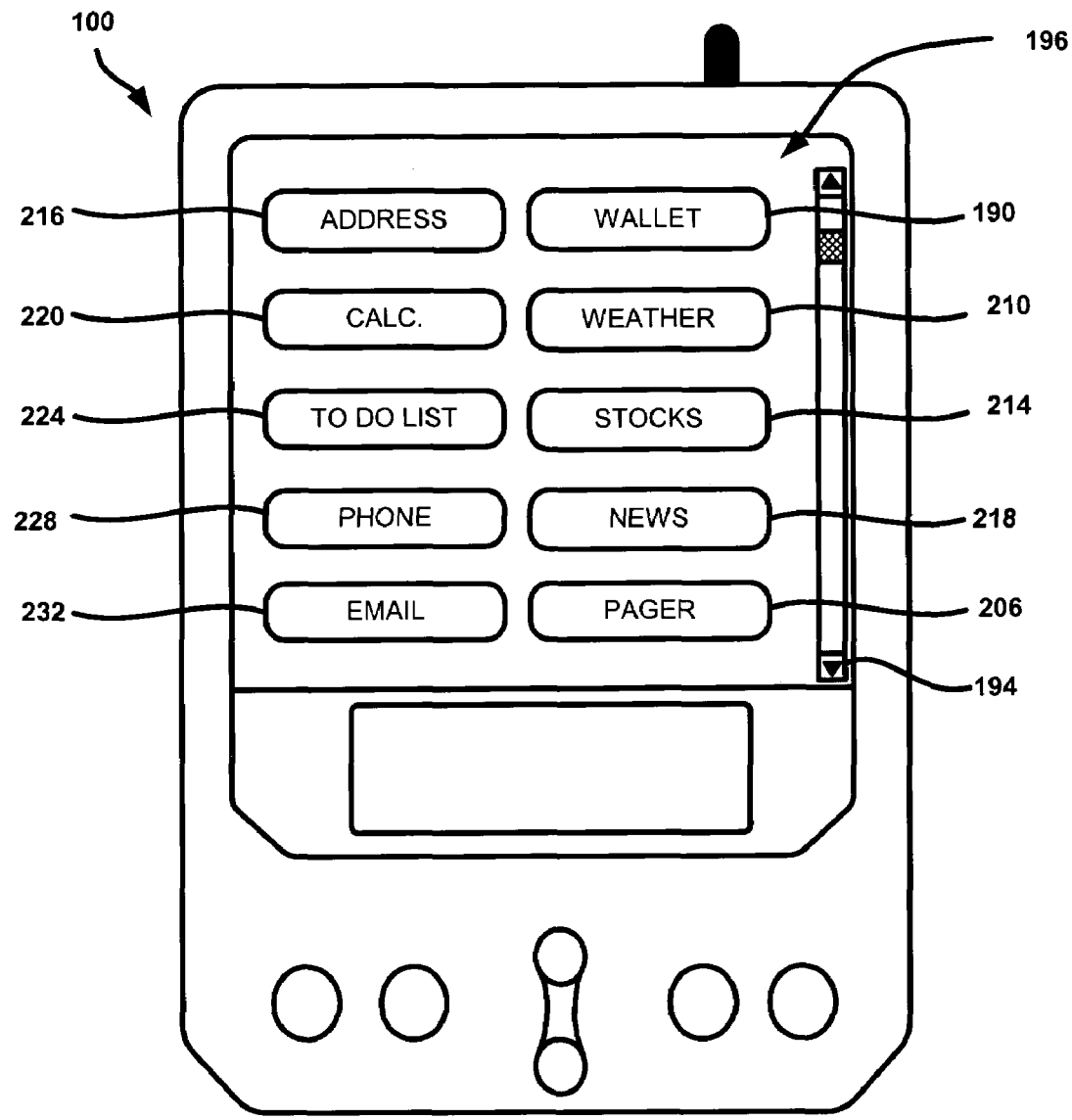
FIG. 7 illustrates an exemplary home screen shot used for selecting an exemplary wallet application that determines a security state of the PDA of FIG. 1.

In another exemplary embodiment, security states of the PDA 100 may be determined electronically, depending on whether an application within the PDA 100 is "open". FIG. 7 shows an exemplary home screen 196 located on the touch-screen display 148 of the PDA 100. The home screen 196 includes a "wallet" GIR 190 that opens an electronic wallet application stored on the PDA 100. The electronic wallet application may enable a user to choose the financial account to be utilized when engaging in a financial transaction with the POS 170. Since the PDA 100 is preferably a multi-functional electronic device, it might have other client-based applications accessible through a phone GIR 228, email GIR 232, pager GIR 206, weather GIR 210, stocks GIR 214, news GIR 218, and other GIRs 216, 220, 224, where each GIR might then initiate a corresponding client-based application. Functional items such as the scroll bar 194 may be included to provide the user with additional touch-screen display 148 based navigation capability.

In an exemplary embodiment, the PDA 100 may regulate financial transactions with the POS 170 depending on whether the wallet application is open. In an exemplary scenario, the PDA 100 detects that the electronic wallet application has been opened after the wallet GIR 190 has been selected. The PDA 100 may treat this as an open security state, and allow financial transactions with the POS 170. If the wallet GIR 190 has not been selected and the wallet application is not in use, the PDA 100 may treat this as a closed security state and restrict financial transactions with the POS 170.

Alternatively, the PDA 100 may send information concerning the status of the wallet application to the POS 170, system processor 186, and/or financial institutions 208, 218, 228, which may then use this information to determine whether to allow or restrict financial transactions. In an exemplary scenario, the PDA 100 may send information about the current security state to the financial institution 208. If an open security state is present (e.g., the wallet application is open), the financial institution 208 may allow financial transactions between the PDA 100 and POS 170. Conversely, if a closed security state is present (e.g., the wallet application is closed), the financial institution 208 may restrict financial transactions between the PDA 100 and POS 170.

It should be understood that the security state of the PDA 100 may be determined by the status of any of the applications stored on the PDA 100. For example, in an alternate embodiment, an open security state may be defined when the stocks GIR 214 has been selected and a stocks program is active. Furthermore, in alternate embodiments, additional security states (e.g., a partially open security state) may also be determined electronically by the status of an application stored on the PDA 100.

VIII. Detecting an Exemplary Security State of the PDA

Figure 8:
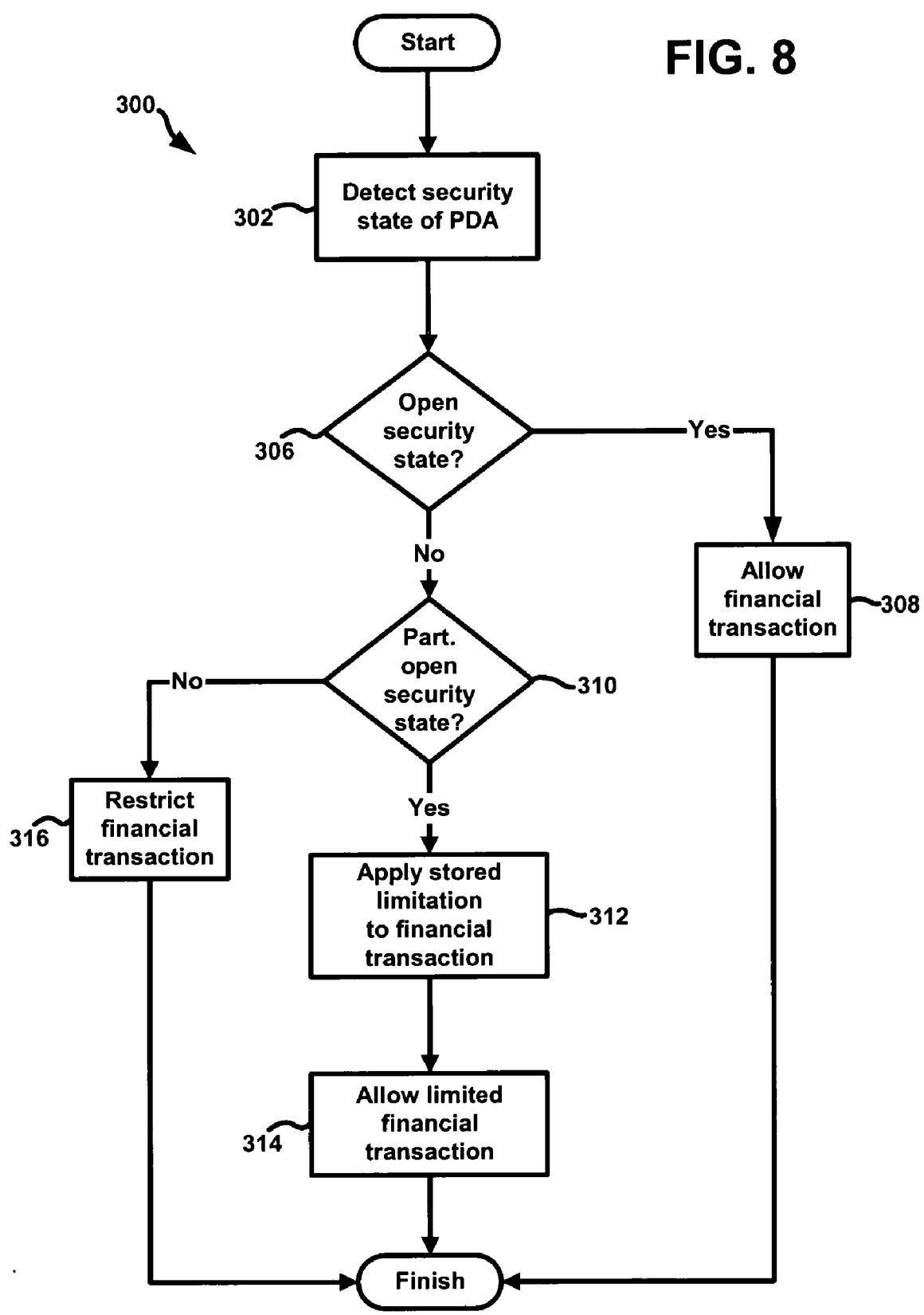
FIG. 8 illustrates a flow chart of an exemplary method of detecting a security state of the PDA of FIG. 1 for determining whether to engage in a financial transaction with the POS of FIG. 2.

Turning now to FIG. 8, an exemplary method 300 of detecting a security state of the PDA 100 for determining whether to engage in a financial transaction with the POS 170 is shown. In step 302, the security state of the PDA 100 may be determined by the relative position of the first piece 110 and the second piece 120, the position of the latch 166, the status of the wallet application, and/or any other mechanism suitable for defining a security state in accordance with the present disclosure. The sensor 132 or other physical and electronic mechanisms (e.g., switch initiated by movement of the latch 166, software program that detects the status of the wallet application, etc.) may be utilized for detecting the current security state in this step.

In step 306, a determination is made whether the PDA 100 is in an open security state. If an open security state is present, the method 300 may move to step 308, and the PDA 100 may engage in a financial transaction with the POS 170. If an open security state is not present, the method 300 may move to step 310, where a determination is made whether the PDA 100 is in a partially open security state.

If a partially open security state is present, the method 300 may move to step 312, where the PDA 100 may search its memory to find any associated limitations to apply to financial transactions with the POS 170. In the present embodiment, the PDA 100 may apply a limitation that restricts the amount of money that can be spent with the POS 170 in a given financial transaction, or during a given time period (e.g., one day). Other limitations may include restricting the types of POS terminals or vendors with whom a transaction may take place, restricting the frequency of financial transactions, or restricting the types of funding sources available for a financial transaction (e.g., digital cash, bank account, etc.) Additionally, when the PDA 100 is in a certain security state (e.g., the partially open security state), it may emit a beeping sound and/or vibrate when a transaction is pending or has been completed. It should be understood that any variety and number of limitations may be utilized in the present step 312. The method 300 may then proceed to step 314, and the PDA 100 may engage in a limited financial transaction with the POS 170, while implementing the limitations obtained in the previous step 312.

Returning to the determination is step 310, if a partially open security state is not present, or if no valid security state is determinable, the PDA 100 may be in a closed security state by default. Alternatively, the PDA 100 may positively detect that the current security state is a closed security state (e.g., through the relative position of the first piece 110 and the second piece 120, the status of the electronic wallet application, etc.) The method 300 may then move to step 316, where the PDA 100 may restrict financial transactions with the POS 170 and close the communication channel 192.

Figure 9:
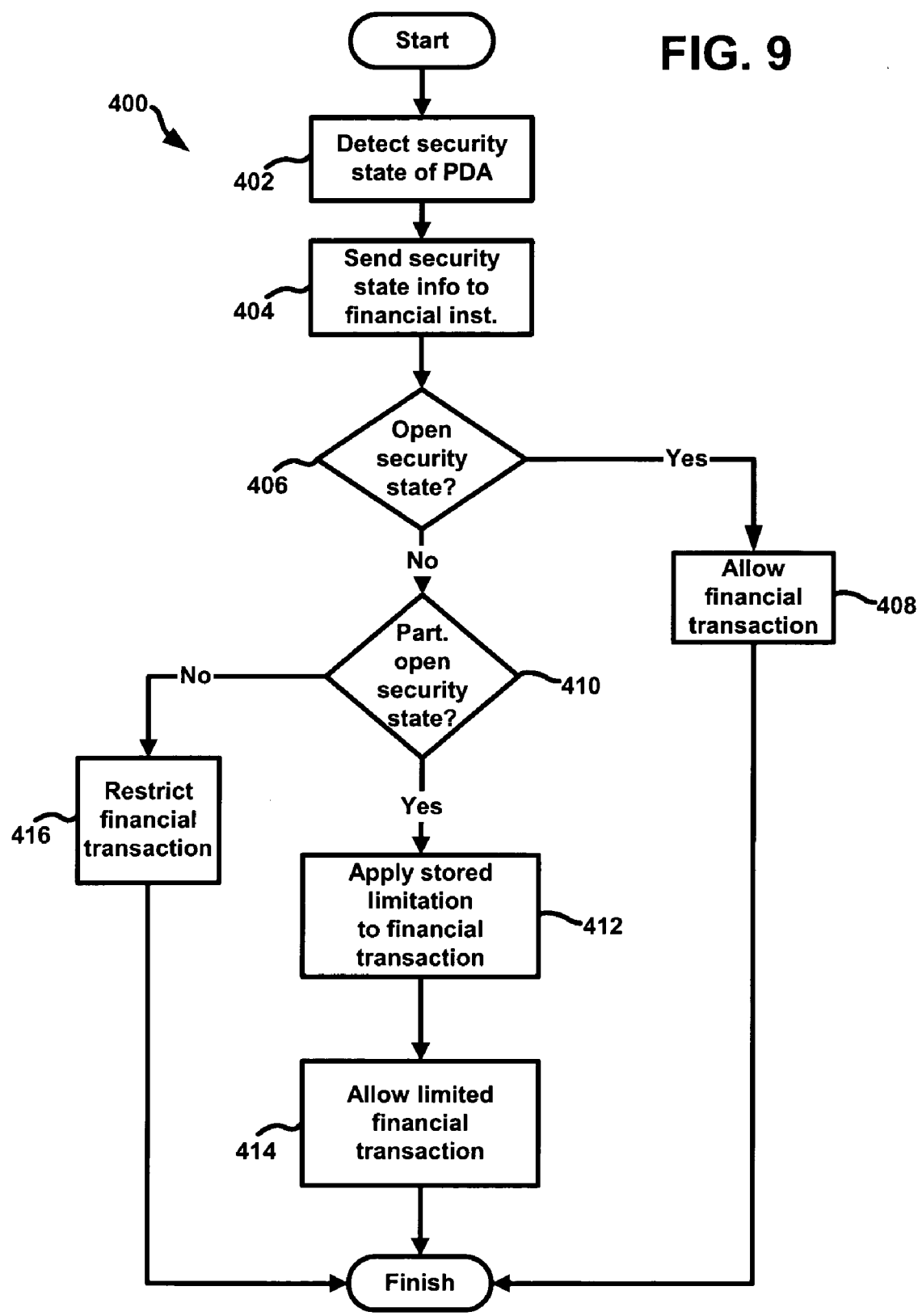
FIG. 9 illustrates a flow chart of an exemplary method of detecting a security state of the PDA of FIG. 1 for communication with at least one of the financial institutions of FIG. 4.

FIG. 9 shows another exemplary method 400 of detecting a security state of the PDA 100 for determining whether to engage in a financial transaction with the POS 170. Step 402 is preferably similar to step 302 in the previously described method 300. Thus, in step 402, the security state of the PDA 100 is determined by the relative position of the first piece 110 and the second piece 120, the position of the latch 166, the status of the wallet application, and/or any other mechanism by which a security state may be defined in accordance with the present disclosure. The sensor 132 or other physical and electronic mechanisms (e.g., switch initiated by movement of the latch 166, software program that detects the status of the wallet application, etc.) may be utilized for detecting the current security state in this step.

In step 404, information about the current security state of the PDA 100 may be sent to a financial institution that has issued the financial account being used for the transaction. For example, if a financial account issued from the first financial institution 208 is being used for the transaction, information about the current security of the PDA 100 may be sent to the first financial institution 208. Preferably, the information may be encrypted before it is sent, and a digital signature may be used to ensure that the information is not tampered with while being transmitted. It should be understood that in alternate embodiments, the information about the current security state may be sent to the POS 170, the network(s) connected to the POS 170, and/or the system processor 186.

The remaining steps 406–416 are preferably similar to steps 306–316 of the previously described method 300. The determinations in steps 406 and 410 may occur at the first financial institution 208. Therefore, the first financial institution 208 may recognize open, closed, and partially open security states and use information concerning the current security state of the PDA 100 in order to determine whether to allow or restrict financial transactions between the PDA 100 and the POS 170. Alternatively, steps 406–416 may occur at the POS 170, the network(s) connected to the POS 170, and/or the system processor 186.

Although the present embodiments have dealt with financial transactions between the PDA 100 and POS 170, they may also apply to any type of software program running on the PDA 100. For example, depending on the security state of the PDA 100, a software program may be allowed or restricted from running. In an exemplary scenario, if the PDA 100 is in a closed security state, a software program stored on the PDA 100 may be prevented from running. Similarly, if the PDA 100 is in an open security state, the software program may be allowed to run. Additionally, if the PDA 100 is in a partially open security state, the software program may be allowed to run with an additional limitation (e.g., certain program features may be restricted). Furthermore, it should be understood that this software program may perform any number of different tasks.

To illustrate, in the present embodiment, the software program may enable the PDA 100 to engage in a financial transaction with the POS 170. In alternate embodiments, the software program may be used to set filtering levels on communications. For example, depending on the security state of the PDA 100, communication media (e.g., voice, email, instant messaging, stock reports, news events, location based advertisements, etc.) may be accepted or blocked. Further, security state information may be used to filter different sources that use the same communication media. For example, the PDA 100 may only accept emails from particular sources, and may block or accept pushed information from location-based advertisements depending on their source. In addition, a user may customize how a security state influences the functionality of a software program, or such determinations may be preset within the PDA 100.

Additionally, it should be understood that transitions between different security states may have different effects on the activation and deactivation of a software program. For example, if a partially open security state is present (e.g., PDA 100c), a transition to an open security state (e.g., PDA 100a) may be sufficient to activate the software program. On the contrary, if a closed security state is present (e.g., PDA 100b), activation of the software program may be more complicated. For example, activation of the software program may require both the latch 166 and the first and second pieces 110, 120 to be in open security state configurations (e.g., PDA 100a in FIGS. 6a and 5a).

Alternatively, a sequence of transitions between security states may be utilized to activate a software program within the PDA 100. For example, if the PDA 100 is in a closed security state (e.g., PDA 100b), activation of a software program may result by changing the PDA 100 to a partially open security state (e.g., PDA 100c) before transitioning to an open security state (e.g., PDA 100a). It should be understood that any number of other parameters may be utilized or combined with the present embodiments for determining the activation of a software program within the PDA 100, such as the number and sequence of required transitions, and the amount of time spent in a security state.

The monitoring system presented in the exemplary embodiments may have numerous advantages. First, a monitoring system using physical or electrical characteristics of the PDA 100 as a mechanism for defining a security state provides a level of security against criminals or others who may mimic the device in order to access a user's financial account (e.g., by copying software programs from the PDA 100). For example, the present system may make it more difficult for a criminal to access a user's financial account while the PDA 100 is in a closed security state. Additionally, by using existing hardware and software (e.g., hardware pieces or software applications on the PDA 100) for determining a security state, few additional resources may be needed for creating the monitoring system, and it may be implemented at minimal additional cost. Also, such as system has the advantage of intuitively bringing the security state of the PDA 100 under the direct manipulation and supervision of the user, which may be useful in a world of wireless transactions. Furthermore, such a monitoring system may also be conveniently combined with a number of identification mechanisms (e.g., personal identification numbers (PINs), serial numbers, fingerprint analysis, passwords, etc.) for a better and more effective monitoring system.

It should be understood that a wide variety of additions and modifications may be made to the exemplary embodiments described within the present application. For example, different exemplary embodiments may be combined to determine a security state. To illustrate, a security state may be defined through a combination of factors, such as the relative position of the first piece 110 and the second piece 120, the position of the latch 166, and the status of the wallet application 196. Additionally, in an alternate embodiment, the financial institutions 208, 218, 228, may all be part of the system processor 186. Furthermore, information about the current security state of the PDA 100 may be sent to another device within the monitoring system independent of whether a financial transaction is taking place. It is therefore intended that the foregoing description illustrates rather than limits this invention and that it is the following claims, including all of the equivalents, which define this invention:

What is claimed is:

1. A portable electronic device comprising:
   a first piece;
   a second piece connected to the first piece by a hinge; and
   a sensor connected to the hinge that detects the relative position of the first piece and the second piece for determining a current security state of the portable electronic device, wherein (i) the portable electronic device is operable to engage in a financial transaction with a point-of-sale device when the current security state is in a first given security state of a plurality of given security states, and (ii) the portable electronic device is not operable to engage in a financial transaction with a point-of-sale device when the current security state is in a second given security state of the plurality of given security states.

2. The portable electronic device of claim 1, wherein the plurality of security states further comprises a partially open security state, and wherein the portable electronic device is operable to engage in a limited financial transaction with a point-of sale device when the current security state is in the partially open security state.

3. The portable electronic device of claim 1, wherein the first given security state comprises an open security state, and wherein the open security state corresponds to the first piece and second piece oriented substantially parallel to one another.

4. The portable electronic device of claim 1, wherein the second given security state comprises a closed security state, and wherein the closed security state corresponds to the second piece covering the first piece.

5. The portable electronic device of claim 4, wherein the closed security state further corresponds to the position of a latch on the portable electronic device.

6. The portable electronic device of claim 5, wherein rotation of the latch causes a locking mechanism on the portable electronic device to engage.

7. A method for determining whether to allow a portable electronic device to carry out a financial transaction, wherein an operative state of a logic component of the portable electronic device defines one of a plurality of current security states, the method comprising, in combination:
   detecting the operative state of the logic component so as to define a current security state of the portable electronic device;
   comparing the current security state to a plurality of given security states so as to determine which one of the plurality of given security states the portable electronic device is operating in;
   if the current security state is in a first given security state of the plurality of given security states, then allowing the portable electronic device to carry out a financial transaction; and
   if the current security state is in a second given security state of the plurality of given security states, then not allowing the portable electronic device to carry out a financial transaction.

8. The method of claim 7, wherein the plurality of given security states comprise an open security state, a partially-open security state, and a closed security state.

9. The method of claim 7, wherein detecting the operative state of the logic component comprises the step of utilizing a sensor to detect the relative position of a first piece and a second piece of the portable electronic device.

10. The method of claim 7, wherein detecting the operative state of the logic component comprises the step of detecting the position of a latch relative to the portable electronic device.

11. The method of claim 7, wherein detecting the operative state of the logic component comprises the step of detecting the status of a software application on the portable electronic device.

12. The method of claim 11, wherein the software application comprises an electronic wallet application.

13. The method of claim 7, further comprising allowing a software application on the portable electronic device to run when the current security state is in the first given security state.

14. The method of claim 7, wherein the carrying out of a financial transaction comprises exchanging financial-transaction information over a communication channel.

15. The method of claim 14, wherein the financial-transaction information comprises any of identification information, payment information, and transaction information.

16. The method of claim 7, wherein the first security state comprises an open security state.

17. The method of claim 16, wherein the carrying out of a financial transaction comprises exchanging financial-transaction information over a communication channel; and wherein the step of allowing the portable electronic device to carry out the financial transaction comprises allowing the portable electronic device to carry out the financial transaction without limiting the financial-transaction information so exchanged.

18. The method of claim 7, wherein the first security state comprises a partially-open security state.

19. The method of claim 18, wherein the carrying out of a financial transaction comprises exchanging transaction parameters over a communication channel; and wherein the step of allowing the portable electronic device to carry out the financial transaction comprises allowing the portable electronic device to carry out the financial transaction using at least one of the transaction parameters.

20. The method of claim 18, wherein the carrying out of a financial transaction comprises exchanging financial-transaction information over a communication channel; and wherein the step of allowing the portable electronic device to carry out the financial transaction comprises allowing the portable electronic device to carry out the financial transaction limiting the financial-transaction information so exchanged.

21. The method of claim 20, wherein the portable electronic device transmits the current security state to the point-of-sale device.

22. The method of claim 7, wherein the second security state comprises a closed security state.

23. The method of claim 22, wherein the carrying out of a financial transaction comprises exchanging transaction parameters over a communication channel; and wherein the step of not allowing the portable electronic device to carry out the financial transaction comprises not allowing the portable electronic device to complete the financial transaction using at least one of the transaction parameters.

24. The method of claim 22, wherein the carrying out of a financial transaction comprises exchanging financial-transaction information over a communication channel; and wherein the step of not allowing the portable electronic device to carry out the financial transaction comprises not allowing the portable electronic device to complete the financial transaction using the financial-transaction information.

25. The method of claim 7, wherein the portable electronic device carries out the financial transaction with a point-of-sale device.

26. The method of claim 7, wherein the portable electronic device comprises a personal digital assistant.

27. A system for determining whether to allow a financial transaction, comprising:
   a point-of-sale device; and
   a portable electronic device, wherein the portable electronic device comprises a processor, and a memory for storing logic executable by the processor to:
   detect the operative state of the logic component so as to define a current security state of the portable electronic device;
   compare the current security state to a plurality of given security states so as to determine which one of the plurality of given security states the portable electronic device is operating in,
   allow the portable electronic device to carry out a financial transaction when the current security state is in a first given security state of the plurality of given security states; and
   not allow the portable electronic device to carry out a financial transaction when the current security state is in a second given security state of the plurality of given security states.

28. The system of claim 27, wherein the plurality of given security states comprise an open security state, a partially-open security state, and a closed security state.

29. The system of claim 28, wherein the open security state corresponds to an open software application on the portable electronic device.

30. The system of claim 28, wherein the closed security state corresponds to a closed software application on the portable electronic device.

31. The system of claim 27, wherein the current security state is defined by the relative position of a first piece and a second piece of the portable electronic device.

32. The system of claim 27, wherein the determination of whether to allow a financial transaction to occur between the portable electronic device and the point-of-sale device is made in at least one of the point-of-sale device, a system processor in communication with the point-of-sale device, and a financial institution in communication with the portable electronic device.

33. The system of claim 27, wherein the first security state comprises an open security state.

34. The system of claim 33, wherein the carrying out of a financial transaction comprises exchanging financial-transaction information over a communication channel; and wherein the logic to allow the portable electronic device to carry out the financial transaction comprises logic to allow the portable electronic device to carry out the financial transaction without limiting the financial-transaction information to be exchanged.

35. The system of claim 27, wherein the first security state comprises a partially-open security state.

36. The system of claim 35, wherein the carrying out of a financial transaction comprises exchanging transaction parameters over a communication channel; and wherein the logic to allow the portable electronic device to carry out the financial transaction comprises logic to allow the portable electronic device to carry out the financial transaction using at least one of the transaction parameters.

37. The system of claim 36, wherein the second security state comprises a closed security state.

38. The system of claim 37, wherein the carrying out of a financial transaction comprises exchanging transaction parameters over a communication channel; and wherein the logic to not allow the portable electronic device to carry out the financial transaction comprises logic to not allow the portable electronic device to complete the financial transaction using at least one of the transaction parameters.

39. The system of claim 37, wherein the carrying out of a financial transaction comprises exchanging financial-transaction information over a communication channel; and wherein the step of not allowing the portable electronic device to carry out the financial transaction comprises not allowing the portable electronic device to complete the financial transaction using the financial-transaction information.

40. The system of claim 35, wherein the carrying out of a financial transaction comprises exchanging financial-transaction information over a communication channel; and wherein the logic to allow the portable electronic device to carry out the financial transaction comprises logic to allow the portable electronic device to carry out the financial transaction limiting the financial-transaction information to be exchanged.

41. The system of claim 27, wherein the portable electronic device comprises a personal digital assistant.

42. A portable electronic device comprising:
   a processor; and
   memory for storing logic executable by the processor to:
   detect the operative state of the logic component so as to define a current security state of the portable electronic device;
   compare the current security state to at least one of a plurality of given security states so as to determine which one of the plurality of given security states the portable electronic device is operating in; and
   allow the portable electronic device to carry out a financial transaction when the current security state is in a first given security state of the plurality of given security states.

43. The portable electronic device of claim 42, wherein the memory further includes logic executable by the processor to not allow the portable electronic device to carry out a financial transaction when the current security state is in a second given security state of the plurality of given security states.

44. The portable electronic device of claim 43, wherein the second security state comprises a closed security state.

45. The portable electronic device of claim 44, wherein the carrying out of a financial transaction comprises exchanging transaction parameters over a communication channel; and wherein the logic to not allow the portable electronic device to carry out the financial transaction comprises logic to not allow the portable electronic device to complete the financial transaction using at least one of the transaction parameters.

46. The portable electronic device of claim 42, wherein the plurality of given security states comprise an open security state, a partially-open security state, and a closed security state.

47. The portable electronic device of claim 46, wherein the open security state corresponds to an open software application on the portable electronic device.

48. The portable electronic device of claim 46, wherein the closed security state corresponds to a closed software application on the portable electronic device.

49. The portable electronic device of claim 42, wherein the first security state comprises an open security state.

50. The portable electronic device of claim 49, wherein the carrying out of a financial transaction comprises exchanging financial-transaction information over a communication channel; and wherein the logic to allow the portable electronic device to carry out the financial transaction comprises logic to allow the portable electronic device to carry out the financial transaction without limiting the financial-transaction information to be exchanged.

51. The portable electronic device of claim 42, wherein the first security state comprises a partially-open security state.

52. The portable electronic device of claim 51, wherein the carrying out of a financial transaction comprises exchanging transaction parameters over a communication channel; and wherein the logic to allow the portable electronic device to carry out the financial transaction comprises logic to allow the portable electronic device to carry out the financial transaction using at least one of the transaction parameters.

53. The portable electronic device of claim 51, wherein the carrying out of a financial transaction comprises exchanging financial-transaction information over a communication channel; and wherein the logic to allow the portable electronic device to carry out the financial transaction comprises logic to allow the portable electronic device to carry out the financial transaction limiting the financial-transaction information to be exchanged.

54. The portable electronic device of claim 42, wherein the portable electronic device comprises a personal digital assistant.

* * * * *